United States Patent
Welch et al.

[11] Patent Number: 6,129,311
[45] Date of Patent: Oct. 10, 2000

[54] ENGINE NACELLE OUTER COWL PANEL WITH INTEGRAL TRACK FAIRINGS

[75] Inventors: John M. Welch; William E. Benton; Michael R. Lobsinger, all of Wichita, Kans.

[73] Assignee: The Boeing Company, Seattle, Wash.

[21] Appl. No.: 09/013,993

[22] Filed: Jan. 27, 1998

Related U.S. Application Data

[60] Provisional application No. 60/054,284, Jul. 30, 1997.

[51] Int. Cl.⁷ .................................................. B64D 29/00
[52] U.S. Cl. .................... 244/117 R; 244/1 N; 244/53 R
[58] Field of Search ..................................... 244/54, 53 R, 244/55, 117 R, 1 N

[56] References Cited

U.S. PATENT DOCUMENTS

| | | |
|---|---|---|
| 4,026,105 | 5/1977 | James . |
| 4,030,290 | 6/1977 | Stachowiak . |
| 4,043,522 | 8/1977 | Vetter . |
| 4,232,513 | 11/1980 | Pearson et al. . |
| 4,235,303 | 11/1980 | Dhoore et al. . |
| 4,421,201 | 12/1983 | Nelsen et al. . |
| 4,463,552 | 8/1984 | Monhardt et al. . |
| 4,495,764 | 1/1985 | Gnagy . |
| 4,539,244 | 9/1985 | Beggs et al. . |
| 4,564,160 | 1/1986 | Vermilye . |
| 4,600,619 | 7/1986 | Chee et al. . |
| 4,759,513 | 7/1988 | Birbragher ............................. 244/1 N |
| 4,759,964 | 7/1988 | Fischer et al. . |
| 4,779,240 | 10/1988 | Dorr . |
| 4,825,644 | 5/1989 | Bubello et al. . |
| 4,826,106 | 5/1989 | Anderson ........................... 244/117 R |
| 4,852,805 | 8/1989 | Vermilye . |
| 5,054,281 | 10/1991 | Mutch . |
| 5,498,462 | 3/1996 | Darfler . |
| 5,743,488 | 4/1998 | Rolston et al. ....................... 244/53 B |

*Primary Examiner*—Robert P. Swiatek
*Attorney, Agent, or Firm*—Christensen O'Connor Johnson & Kindness PLLC

[57] ABSTRACT

An outer cowl panel (24) for an engine nacelle (20). The outer cowl panel (24) includes integral track fairings (30) at aft side edges of the outer cowl panel. The outer cowl panel (24) also includes a chamfered leading edge having outer face sheets (88A, 88B) that extend over the leading edges of a stepped stack of prepreg sheets (88C, 88D, 88E, 88F).

11 Claims, 11 Drawing Sheets

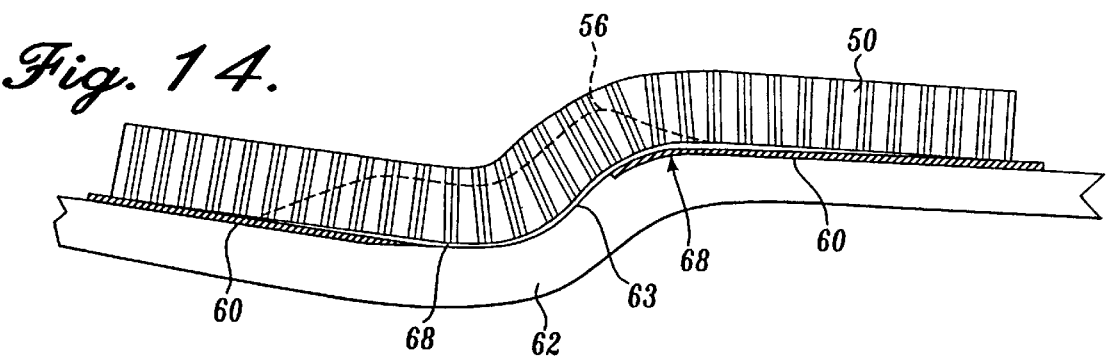
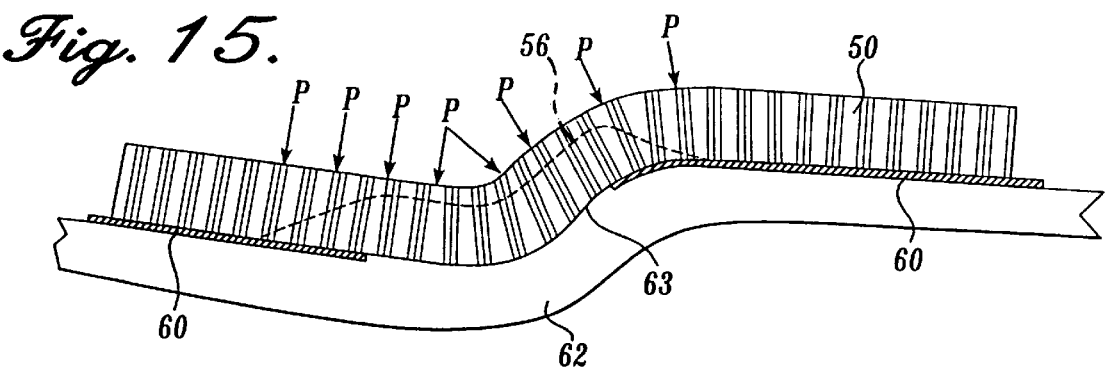
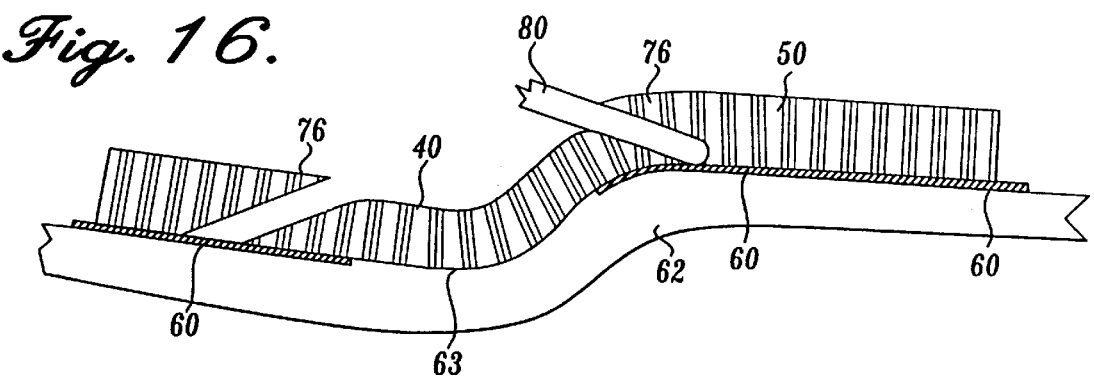
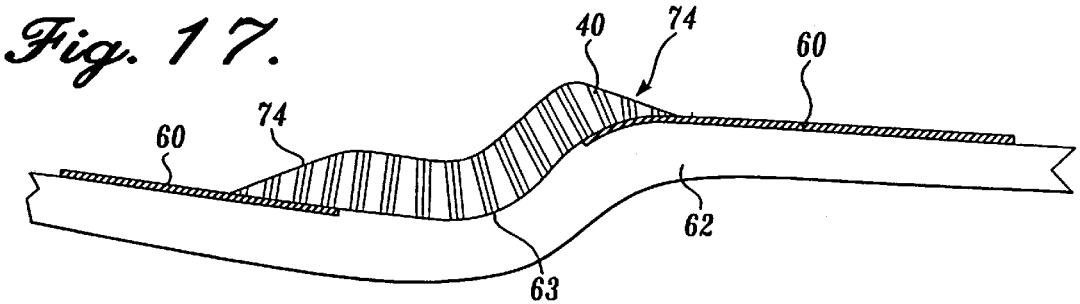

ENGINE NACELLE OUTER COWL PANEL WITH INTEGRAL TRACK FAIRINGS

REFERENCE TO RELATED APPLICATION

This application claims the benefit of U.S. Provisional Application Ser. No. 60/054,284, filed Jul. 30, 1997.

FIELD OF THE INVENTION

This invention is directed to a thrust reverser assembly for a high bypass jet engine, and, more specifically, a method and apparatus for forming an outer cowl panel for a thrust reverser assembly.

BACKGROUND OF THE INVENTION

Airplane manufacturers are under increasing pressure to produce lightweight, strong, and durable aircraft at the lowest cost for manufacture and lifecycle maintenance. An airplane must have sufficient structural strength to withstand stresses during flight, while being as light as possible to maximize the performance of the airplane. To address these concerns, aircraft manufacturers have increasingly used fiber-reinforced resin matrix composites.

These composites provide improved strength, fatigue resistance, stiffness, and strength-to-weight ratio by incorporating strong, stiff, carbon fibers into a softer, more ductile resin matrix. The resin matrix material transmits forces to the fibers and provides ductility and toughness, while the fibers carry most of the applied force. Unidirectional continuous fibers can produce anisotropic properties, while woven fabrics produce quasi-isotropic properties. Honeycomb core is often sandwiched between composite sheets to provide stiff panels having the highest specific strength.

As shown in FIG. 1, a nacelle 10 for a commercial high bypass jet engine includes a thrust reverser assembly having a fore-and-aft translating sleeve 11 to cover or expose thrust reverser cascades 12 when deploying thrust reverser blocker doors 15 carried on the translating sleeve. The thrust reverser assembly is positioned just aft of a jet engine, not shown, as is used on an airplane. The thrust reverser assembly is fitted within the nacelle 10. The thrust reverser cascades 12 are circumferentially spaced around the interior of the nacelle.

During normal flying operations the translating sleeve 11 is in a closed, or forward, position to cover the thrust reverser cascades 12. For landing an airplane, the translating sleeve 11 is moved from the closed position to the rearwardly extended, or deployed, position by means of actuator rods 18. This positioning routes fan by-pass air to flow through the thrust reverser cascades 12 so as to slow down the aircraft on the ground. Fan by-pass air or "fan flow" is rerouted through the thrust reverser cascades 12 by closing the circumferentially positioned blocker doors 15.

The translating sleeve 11 is usually formed from a pair of semi-cylindrical outer cowl panels 13 (only one shown in FIG. 2) and a pair of semi-cylindrical inner acoustic panels 14 (only one shown in FIG. 2) bonded together to form the aft portion of the cylindrical nacelle 10. The outer cowl panels 13 and the acoustic panels 14 are bonded at their aft ends and branch or diverge to provide a chamber for containing and concealing the thrust reverser cascades 12 and the associated support structures.

When the translating sleeve 11 is in the stowed position (FIG. 2), the leading ends of the acoustic panel 14 and the outer cowl panel 13 extend on opposite sides of the thrust reverser cascades 12. When the thrust reverser is deployed, the translating sleeve 11 is moved aft to expose the cascades 12 (FIG. 3). The fan duct blocker doors 15 at the forward end of the acoustic panel 14 are deployed to divert fan flow through the cascades 12.

The thrust reverser assembly includes tracks mounted within the nacelle along which the translating sleeve 11 slides during deployment of the thrust reversers. When the translating sleeve 11 is in the stowed position, the tracks fit within track fairings 17 (FIG. 4) on the outer surface of the outer cowl panel 13. For proper air flow over the back edge of the translating sleeve 11, the track fairings 17 include complex geometries including transition areas 18 having steep angles with short radii curvature.

Track fairings 17 on prior art aircraft are provided as a separate assembly (FIG. 4) that is attached to the aft side edges of the outer cowl panel 13 via metal clips and brackets (not shown). The clips and brackets add additional weight to the assembly and require a significant amount of time to assemble. Each clip and bracket is designed to fit a different contoured surface. Matching the surfaces of the clips and brackets to the complex surfaces of the track fairings 17 is often difficult. Precise positioning is important for drag reduction. Shimming is usually required to properly fit the track fairings 17 against the outer cowl panel 13.

It has not been practical using conventional composite forming methods to shape a honeycomb core for use in track fairings. Typically, in prior art formation methods, core material is shaped over a tool surface that is configured substantially the same as the final lay-up mandrel on which the core material is cured. This prior art method of forming a core poses problems when forming a complex structure like a honeycomb core for a track fairing for an outer cowl panel. The severe contour of the transition areas of the track fairings combined with short lead-in surfaces resulted in crushing and splitting of the core along the tight radii at the stepped transition area. In addition, after forming the core to a concave lay-up mandrel, the tight-radius curves exhibited spring-back, which caused the transition areas to form to an incorrect shape upon curing. Residual thermal stresses produced during curing also caused the transition areas in the conventionally-formed composite panels to straighten. Unacceptable contours at critical aerodynamic locations were the result.

Because a honeycomb core could not be formed for use within the track fairings, conventional track fairings, incorporating a Nomex® core and graphite, fiberglass, or Kevlar® reinforced inner and outer skins, were formed separately from the composite outer cowl panel and were attached to the aft edges of the outer cowl panel. Sometimes the track fairings were molded. The separately-formed track fairings required special fittings and fasteners for attachment to the outer cowl panel resulting in large part counts, excessive inventory cost, and considerable assembly time by highly skilled craftsmen.

Attempts to form track fairings integrally with a honeycomb core composite outer cowl panel have not been successful. One effort involved designing a more gradual transition area for the track fairings 17 so that the honeycomb core could extend through the transition areas for the track fairings. The panel would maintain its shape after curing. The more gradual transition created aerodynamic problems at the aft portion of the translating sleeve 11 as well as wing interfacing flight control devices in close proximity to the track fairing locale. The more gradual transition increased drag, produced shocks that buffeted the wings leading edge flight control devices (i.e., slats and flaps), and generated noise. A new design was needed.

The leading edge of a conventional outer cowl panel is formed by stacking prepreg sheets to form a laminate. The laminate is chamfered, stepped, or shaped to reduce aerodynamic drag at the leading edge, but wind erosion caused excessive erosion. Exposed fibers in the laminate at the chamfered edge peeled or frayed or left loose ends that whipped against adjacent areas of the chamfered edge and caused further erosion.

SUMMARY OF THE INVENTION

The present invention is a method for making a composite nacelle engine outer cowl panel defining an aft edge. The method includes fabricating a track fairing for extending around tracks for translating the outer cowl panel, the track fairing formed integral with the aft edge of the outer cowl panel.

In accordance with another aspect of the present invention, the integral track fairing includes a composite core sandwich structure.

In accordance with other aspects of the present invention, the honeycomb sandwich structure includes an inner face sheet, an outer face sheet, and a honeycomb composite core.

In accordance with yet other aspects of the present invention, the outer cowl panel includes a composite outer face sheet, a core material, and a composite inner face sheet. The composite outer face sheet of the outer cowl panel includes the outer face sheet of the integral track fairing, and the composite inner face sheet of the outer cowl panel includes the inner face sheet of the integral track fairing.

In accordance with still another aspect of the present invention, the method includes fabricating a second integral track fairing into the aft edge of the outer cowl panel.

In accordance with yet still another aspect of the present invention, the composite core is a honeycomb core.

The present invention also provides a composite outer cowl panel for an engine nacelle. The outer cowl panel includes a composite inner face sheet, a central core extending over the composite inner face sheet and having an outer surface opposite the composite inner face sheet, and a composite outer face sheet extending over the outer surface of the core and defining a leading edge and an outer surface opposite the core. The outer cowl panel also includes an integral track fairing for extending around tracks for translating the outer cowl panel, the integral track fairing formed out of the trailing edges of the composite inner face sheet and the composite outer face sheet, the integral track fairing comprising a composite core sandwiched between the composite inner face sheet and the composite outer face sheet.

In accordance with further aspects of the present invention, the outer cowl panel adjacent to the integral track fairing defines a plane, and the integral track fairing comprises a stepped transition area extending at a first angle to the plane of the outer cowl panel.

In accordance with still further aspects of the present invention, the first angle is approximately 115°.

In accordance with another aspect of the present invention, the integral track fairing includes an outer fairing surface extending at a second angle to the stepped transition area.

In accordance with still another aspect of the present invention, the second angle is approximately 88°.

In accordance with yet still another aspect of the present invention, the composite core extends along the stepped transition, through the second angle between the stepped transition area and the outer fairing surface, and along the outer fairing surface.

The present invention also provides a method of forming a composite panel. The method includes arranging a carrier ply on a lay-up mandrel and arranging at least two core pieces on the carrier ply. The two core pieces and the carrier ply are cured so as to form a core assembly. A composite outer sheet, the core assembly, and a composite inner sheet are stacked on the lay-up mandrel, and the composite outer sheet, the core assembly, and the composite inner sheet are cured to form a composite sandwich panel.

In accordance with another aspect of the present invention, the carrier ply has at least two holes therethrough, and a core piece is arranged over each of the holes so as to partly extend over the holes. The core pieces that are arranged over the holes and the carrier ply are cured so as to form the core assembly.

In accordance with yet still another aspect of the present invention, one of the cores is configured to fit within a track fairing on a composite outer cowl panel of an engine nacelle.

In accordance with yet still other aspects of the present invention, another core is configured to be received within a second track fairing on the outer cowl panel.

The present invention further provides a method of forming a stable honeycomb core. The method includes heat-forming a honeycomb core sheet on a shaping tool having a first contour so as to form a bent core sheet having a mandrel side and an opposite upper side, the bent core sheet having first residual stresses formed therein by the heat-forming. The bent core sheet is removed from the shaping tool and the upper side of the bent core sheet is arranged against a lay-up mandrel, the lay-up mandrel having a second contour substantially opposite the shaping tool contour. The bent core sheet is then bagged in a vacuum bag and cured while applying suction to the vacuum bag so as to form a contoured honeycomb core. Second residual stresses are formed during curing within the contoured honeycomb core, the first residual stresses being substantially opposite the second residual stresses so that a substantially stable contoured honeycomb core is formed.

In accordance with further aspects of the present invention, the method includes arranging a first composite sheet against a lay-up mandrel surface having a contour substantially matching the second contour, arranging the contoured honeycomb core over the first composite sheet, and arranging a second composite sheet over the contoured honeycomb core. The first composite sheet, the contoured honeycomb core, and the second composite sheet form a sandwiched composite structure. The sandwiched composite structure is cured.

In accordance with yet further aspects of the present invention, a carrier ply is arranged on the lay-up mandrel prior to arranging the opposite upper side of the bent core sheet against the second lay-up mandrel. The bent core sheet is then arranged over the carrier ply.

In accordance with yet still another aspect of the present invention, the carrier ply is cured with the bent core sheet so as to form a core assembly. A first composite sheet is arranged on a lay-up mandrel having a contour that is substantially the same as the second contour, the core assembly is arranged over the first composite sheet, and a second composite sheet is arranged over the core assembly. The first composite sheet, the core assembly, and the second composite sheet are then cured to forming a sandwiched core structure.

The present invention further provides an outer cowl panel for a nacelle engine having a carbon fiber reinforced laminate having a leading edge defined by stacking of a plurality of plies to form the laminate and a facing ply with fiberglass reinforcement covering the leading edge to provide erosion protection.

In accordance with another aspect of the present invention, the plurality of plies includes a first fiber/resin sheet, the first fiber/resin sheet extending toward the leading end of the outer cowl panel so as to form a first end, a second fiber/resin sheet, the second fiber/resin sheet extending over the first fiber/resin sheet and extending to a second end, the first end being closer to the leading end than the second end, and a third fiber/resin sheet extending over and against the second fiber/resin sheet, the third fiber sheet extending past the second end and downward toward the first end and attaching to the first end such that the third fiber/resin sheet forms the facing ply.

In accordance with yet another aspect of the present invention, the plurality of plies further includes a fourth fiber/resin sheet extending over and against the third fiber/resin sheet, the leading end of the fourth fiber/resin sheet extending downward so as to form the facing ply with the third fiber/resin sheet.

In accordance with still another aspect of the present invention, the facing ply includes fiberglass fibers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 14 is a diagrammatic view showing the honeycomb core of FIG. 12 inverted onto a lay-up mandrel over the carrier ply of FIG. 13;

FIG. 15 illustrates adhering the honeycomb core to the lay-up mandrel with vacuum pressure;

FIG. 16 illustrates machining the honeycomb core sheet on the lay-up mandrel to remove excess material;

FIG. 17 illustrates the formed and machined honeycomb core for the track fairings attached to the carrier ply of FIG. 13;

DETAILED DESCRIPTION OF THE PREFERRED EMBODIMENT

Figure 5:
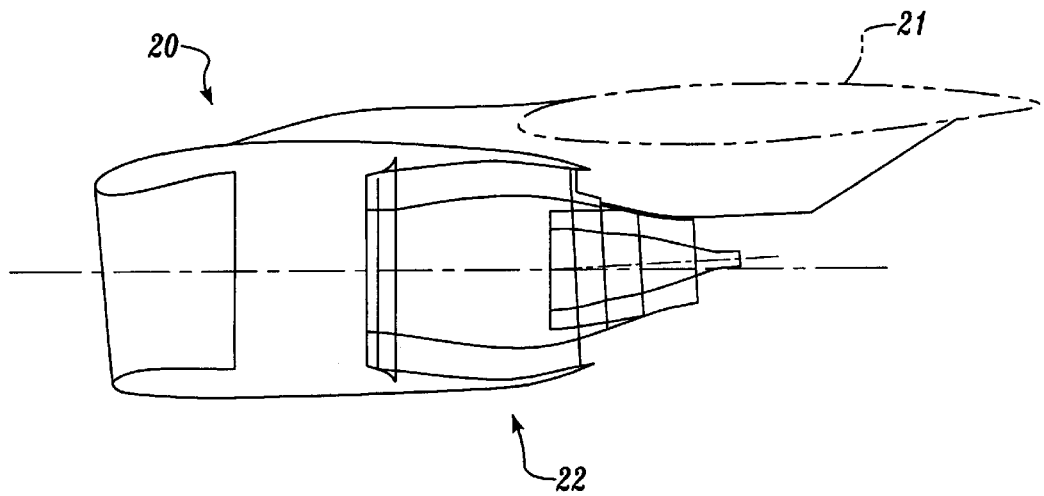
FIG. 5 is a diagrammatic elevation in partial cut-away of a nacelle incorporating the present invention.

Referring now to the drawings, in which like reference numerals represent like parts throughout the several views, FIG. 5 shows a nacelle 20 mounted by a strut under the wing 21 of an airplane. A translating sleeve 22 that is part of a thrust reverser assembly 23 (FIG. 6) is located at the aft portion of the nacelle 20.

Figure 6:
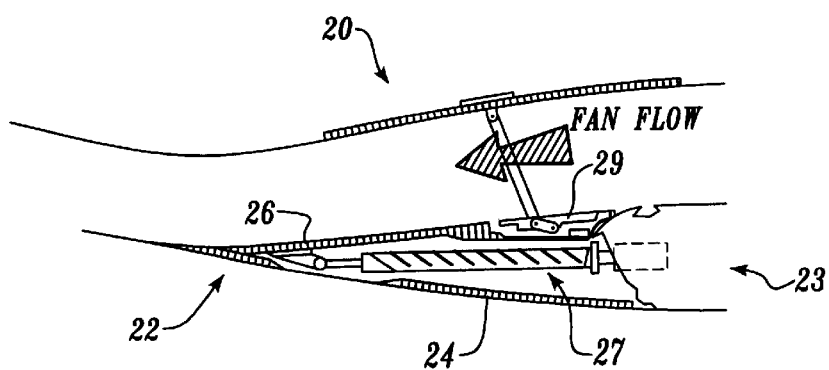
FIG. 6 is a cross-section similar to FIG. 2 showing the nacelle of FIG. 5 with the thrust reverser blocker doors in their stowed position.

The generally semi-cylindrical translating sleeve 22 is formed by two outer cowl panels 24 (only one is shown in FIG. 6) and two inner acoustic panels 26 (only one shown). For ease of reference, only one of the outer cowl panels 24 and one of the acoustic panels 26, and their respective connections to each other, will be described. The other outer cowl panel 24 and other acoustic panel 26 are substantially the same as the outer cowl panel and acoustic panel described, but may be arranged differently because of the location within the nacelle 20 and the relative position of the panels in relation to the thrust reverser assembly 23.

The outer cowl panel 24 and the acoustic panel 26 are bonded at their aft ends and branch or diverge to provide a chamber for containing and concealing thrust reverser cascades 27 and the associated support structures. When the translating sleeve 22 is in the stowed position, the leading ends of the acoustic panel 26 and the outer cowl panel 24 extend on opposite sides of thrust reverser cascades 27 (FIG. 6). When the thrust reverser assembly 23 is deployed, the translating sleeve 22 moves aft to expose the thrust reverser cascades 27. During this movement, fan duct blocker doors 29 attached to the forward end of the acoustic panel 26 are deployed to direct fan flow through the thrust reverser cascades 27.

Figure 1:
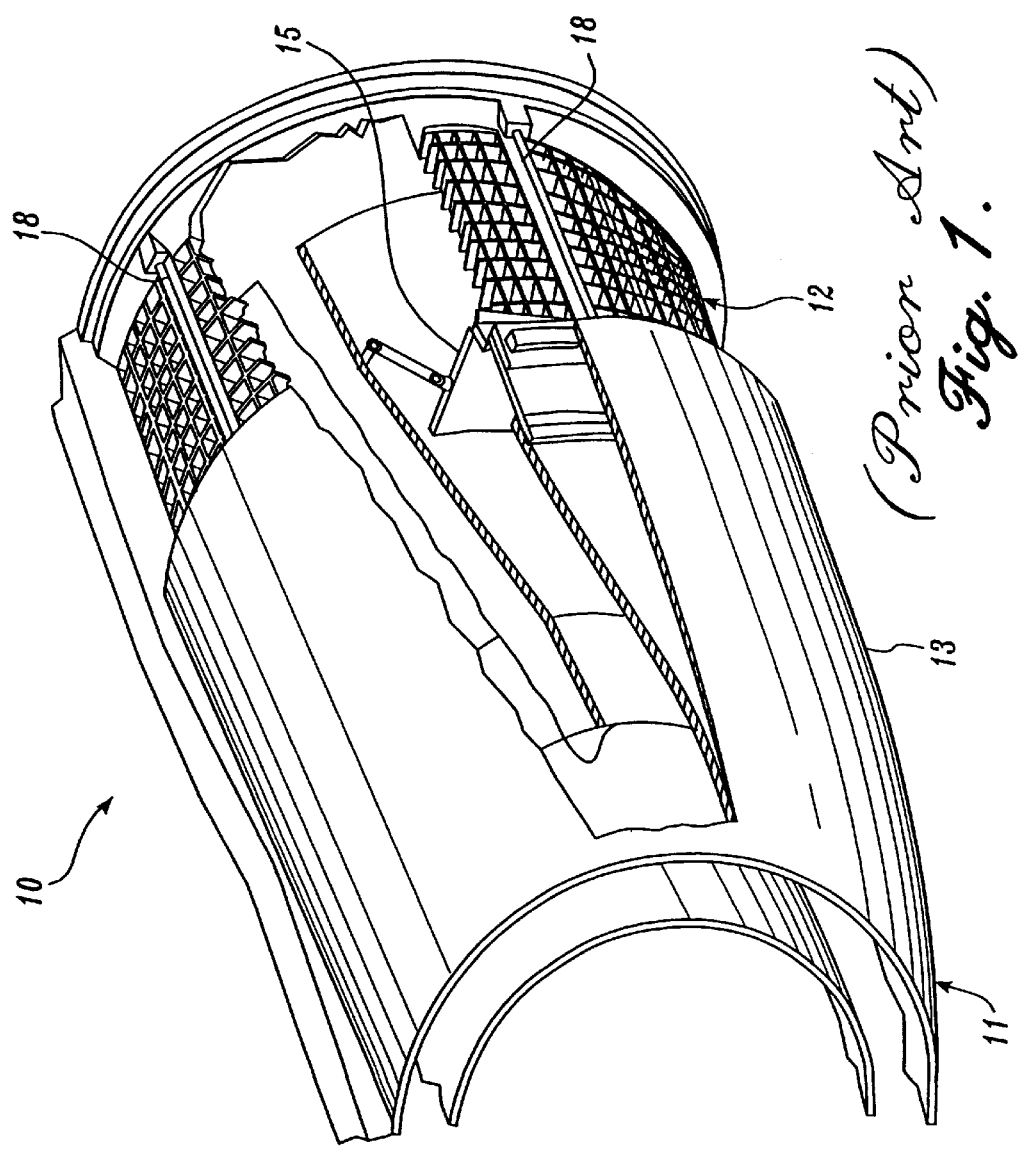
FIG. 1 is a fragmentary, partially cut-away pictorial view of a jet engine nacelle, illustrating a portion of a prior art jet engine thrust reverser assembly.
Figure 2:
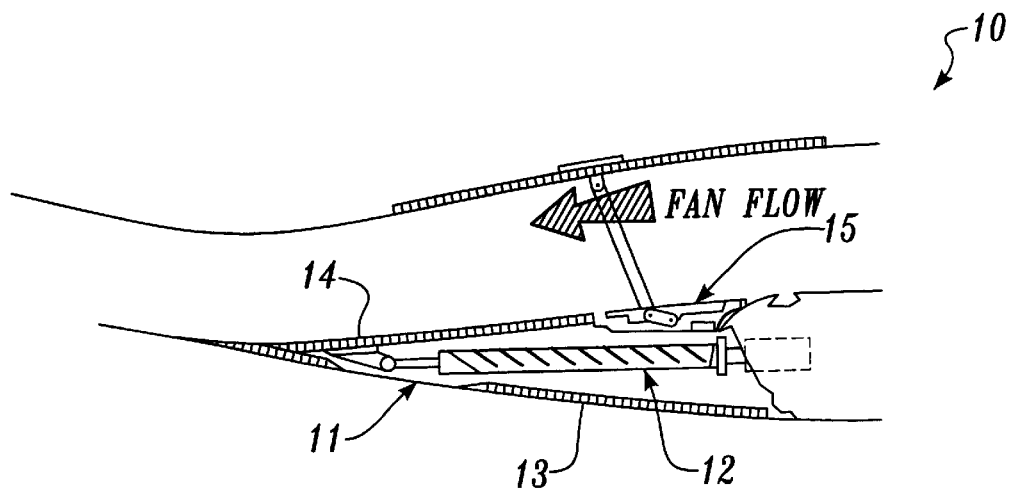
FIG. 2 is a partial cross-section, taken fore-to-aft, of the translating sleeve for the thrust reverser assembly of FIG. 1, with the thrust reverser blocker doors in their stored position.
Figure 3:
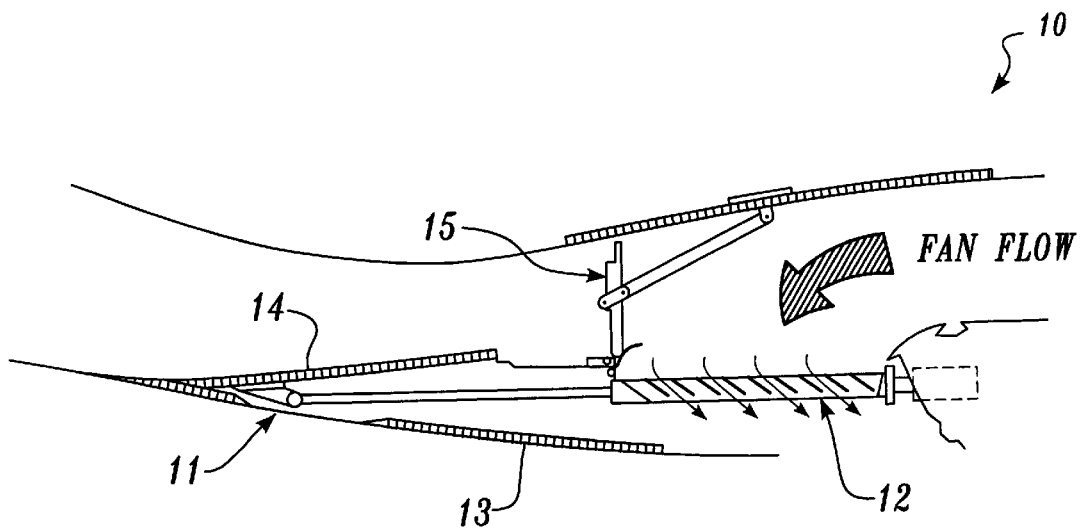
FIG. 3 is a partial cross-section, similar to FIG. 2, with the thrust reverser blocker doors in their deployed position.
Figure 4:
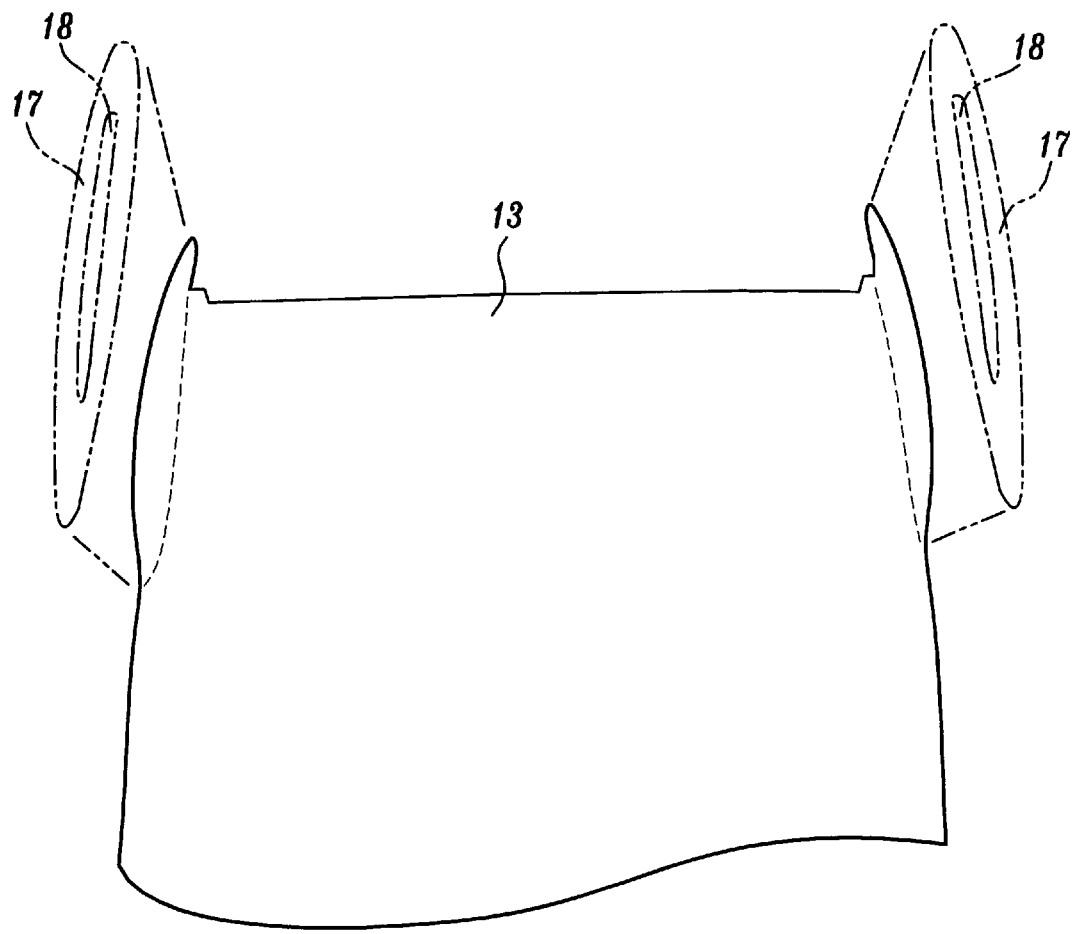
FIG. 4 is a plan view of a prior art outer cowl panel with separate track fairings attached to aft side edges.
Figure 7:
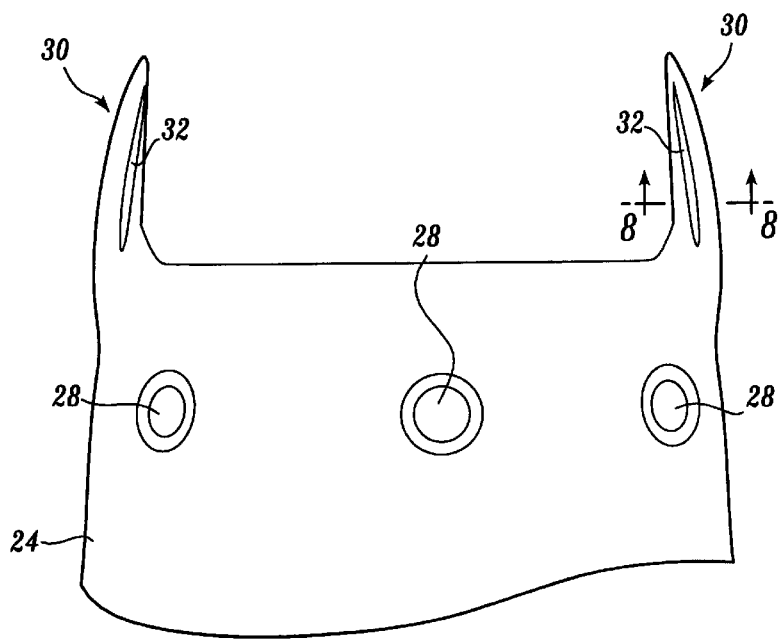
FIG. 7 is a plan view of an outer cowl panel of the present invention for use in the nacelle of FIG. 5.
Figure 9:
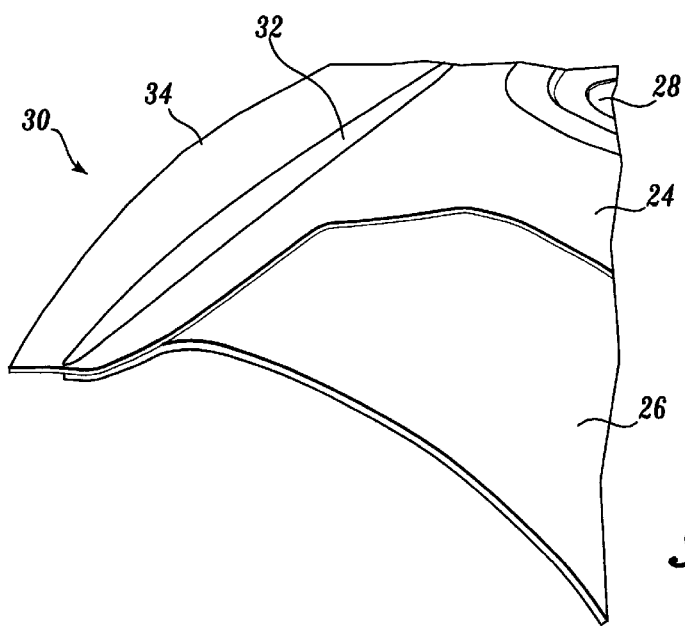
FIG. 9 is an isometric view of the upper, aft portion of the outer cowl panel joined to an acoustic panel.

The outer cowl panel 24 includes holes 28 (FIG. 7) through which the attachments for the actuator rods 18 extend (FIG. 1). Integral track fairings 30 extend rearwardly from the aft port and starboard side edges of the outer cowl panel 24. The track fairings 30 are shaped to minimize drag and to streamline airflow during normal (rearward thrust) operation of the jet engine. As can best be seen in FIG. 9, the track fairings 30 include a stepped transition area 32 that raises to an outer fairing surface 34. The outer fairing surface 34 is substantially parallel to the rear surface of the outer cowl panel 24. The stepped transition area 32 extends upward at an angle of approximately 115 degrees to the rear surface of the outer cowl panel 24. The radius for the curvature between the stepped transition area 32 and the rear surface of the outer cowl panel 24 is approximately 0.5 inch. The outer fairing surface 34 of the track fairings 30 extends at an angle of approximately 88 degrees to the stepped transition area 32. The radius for the curvature between the outer fairing surface 34 and the stepped transition area 32 is approximately 0.75 inch.

For ease of reference, only one of the integral track fairings 30 will be described. It is to be understood that the other track fairing 30 is substantially a mirror-image of the track fairing 30 described, but may be arranged differently because of different hardware arrangements on opposite sides of the outer cowl panel 24.

Figure 8:
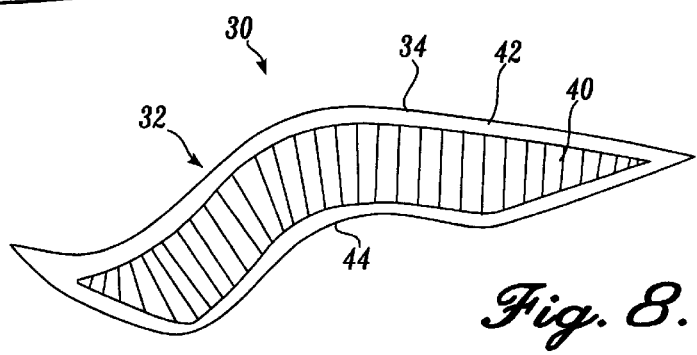
FIG. 8 is a sectional view of the track fairings for the outer cowl panel of FIG. 7 taken generally along the line 8—8.
Figure 10:
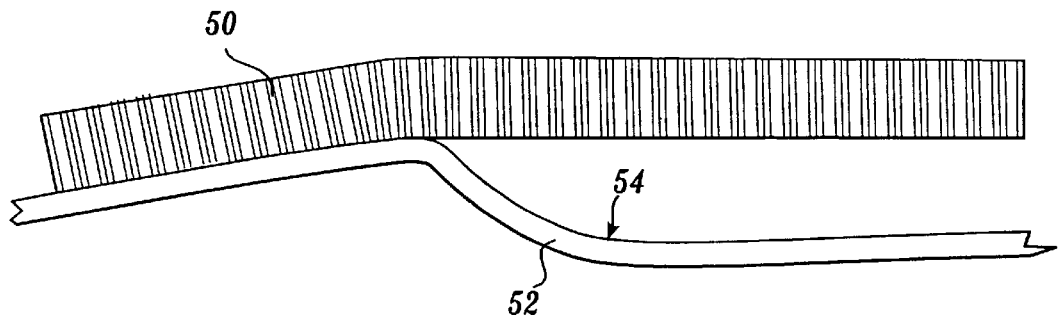
FIG. 10 is a diagrammatic view of a first stage of a process of the present invention for heat forming honeycomb core for the track fairing for the outer cowl panel shown in FIG. 7.
Figure 11:
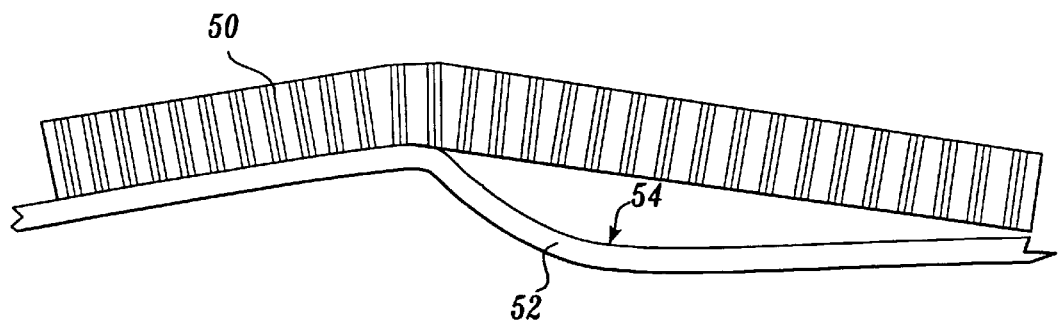
FIG. 11 is a diagrammatic view showing a later stage of the heat forming the honeycomb core of FIG. 10.
Figure 12:
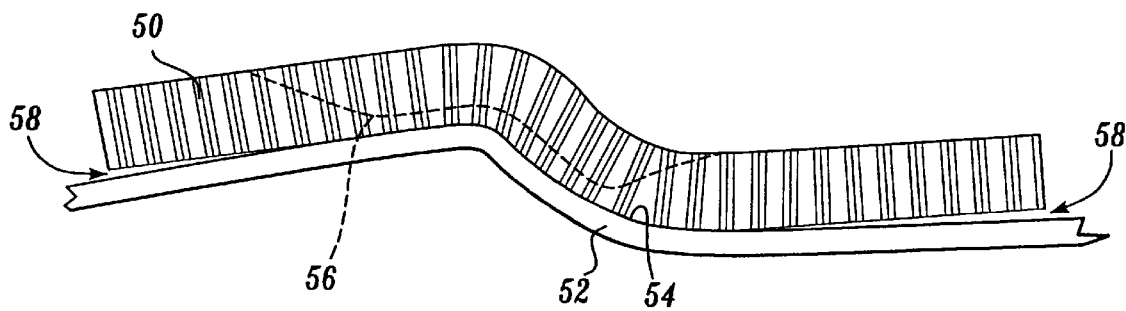
FIG. 12 is a diagrammatic view showing a final stage of heat forming the honeycomb core with the track fairing portion identified in phantom.

Each track fairing 30 includes a structural honeycomb core 40 (FIG. 8) between an outer face sheet 42 and an inner face sheet 44. Formation of the honeycomb core 40 is shown in FIGS. 10–12 and 14–17. FIGS. 10–12 illustrate the initial or "heat-forming" stages for formation of the honeycomb core 40 in which a honeycomb core sheet 50 is shaped against the male contour 54 of a shaping tool 52. Then the honeycomb core sheet 50 is flipped over and is shaped against a first concave lay-up mandrel 62 in a curing process shown in FIGS. 14–15. The honeycomb core 40 is then machined from the honeycomb core sheet 50 in the process shown in FIGS. 16–17.

The shaping tool 52 has a male contour 54 that substantially matches the intended final contour of the side of the honeycomb core 40 that extends against the inner face sheet 44. The honeycomb core sheet 50 is preferably a fiberglass over-expanded core with phenolic resin. However, the present process can be used to form any core material that is difficult to shape into a complex geometry and which has a tendency not to maintain its shape after forming.

Now, discussing the "heat forming" process for the core in greater detail, a heat gun is used to form the honeycomb core sheet 50 against the male contour 54 of the shaping tool 52. Heat is applied to the areas where the honeycomb core sheet 50 is being bent as the honeycomb core sheet is slowly worked by hand in a forward-to-aft direction against the contour of the shaping tool 52. The forming process takes several minutes because the honeycomb core sheet 50 must be heated until the core material becomes plastic, so that the honeycomb core sheet can be formed around and against the contour of the shaping tool.

After heat-forming, the honeycomb core sheet 50 extends substantially against the outer contour 54 of the shaping tool 52. The shape for the honeycomb core 40 for the track fairings 30 is formed on the side of the honeycomb core sheet 50 opposite the shaping tool 52. The final shape for the honeycomb core 40 for the track fairings 30 is outlined by the dotted line 56 in FIG. 12.

There is inherent spring-back in the honeycomb core sheet 50 caused by residual thermal stresses formed by shaping the honeycomb core sheet 50 against the mandrel during the heat-forming process. This spring-back causes the outer edges of the honeycomb core sheet 50 to separate from the outer contour 54 of the shaping tool 52 (shown generally by the arrows 58 in FIG. 12). This inherent spring-back is useful in formation of the honeycomb core 40 for the track fairings 30, as will be described in detail below.

Figure 13:
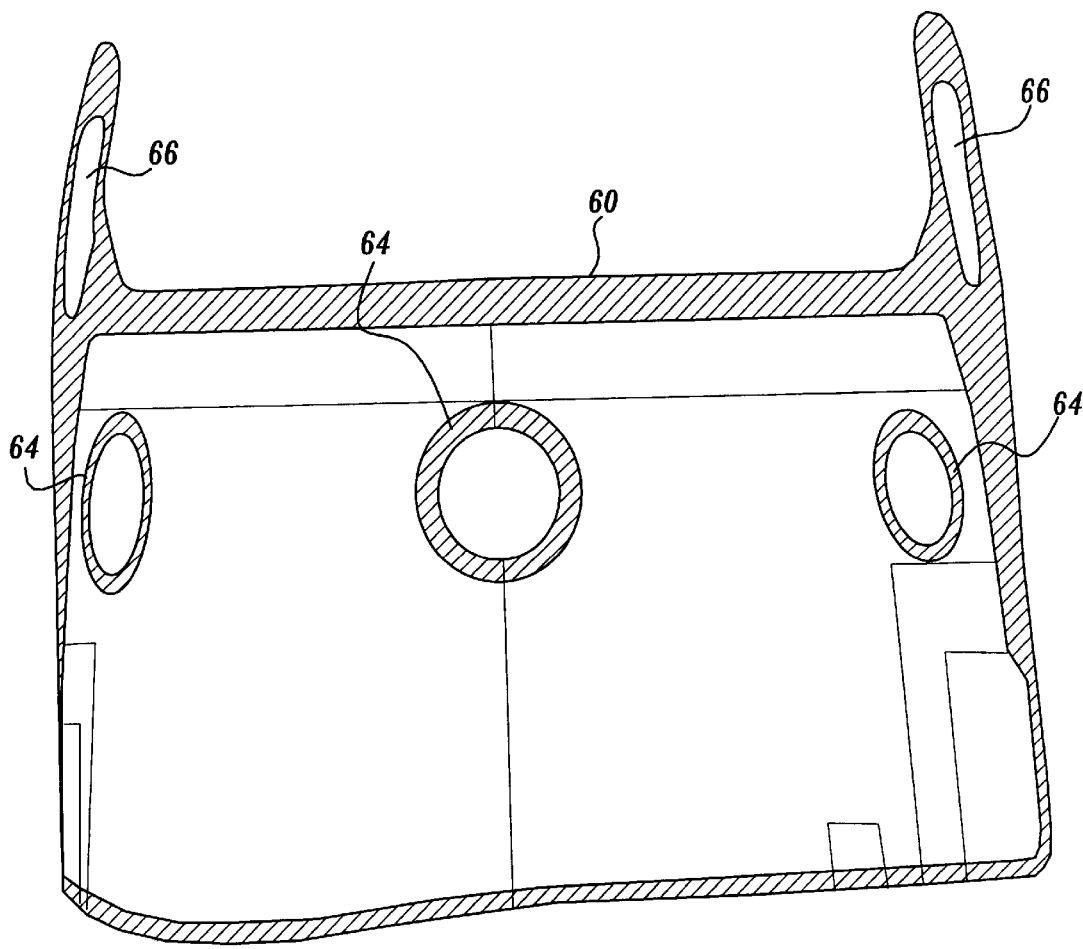
FIG. 13 is a plan view of a carrier ply for use in forming an outer cowl panel.

A carrier ply 60 (FIG. 13) is used in the curing stage for the honeycomb core 40. As described in detail below, the carrier ply 60 structurally bonds pieces, including the honeycomb core 40, together to form a core assembly 72 (FIG. 18) that is used to form the outer cowl panel 24. The core assembly can be handled as a single unit during subsequent operations which greatly simplifies handling and positioning of the otherwise separate features or details.

Figure 19:
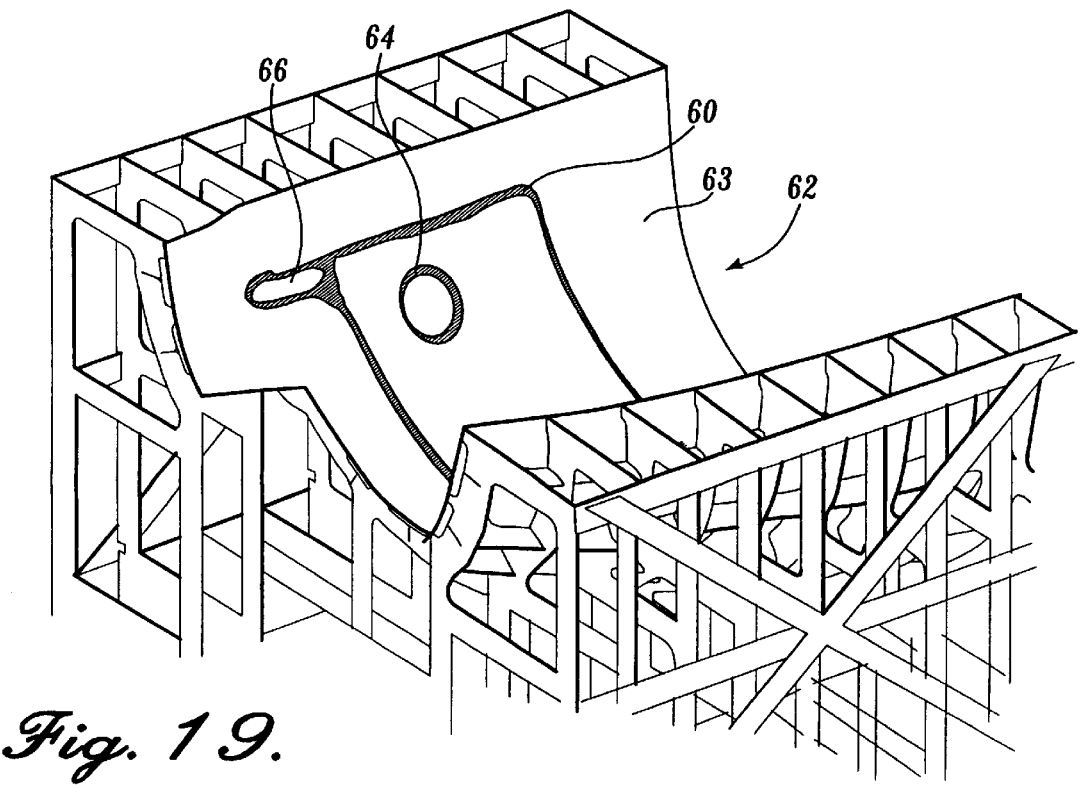
FIG. 19 shows a first concave lay-up mandrel for forming the core assembly of FIG. 18 with the carrier ply of FIG. 13 in place.

The carrier ply 60 is arranged on a first concave lay-up mandrel 62 (FIG. 19) that substantially matches the outer contour of the outer cowl panel 24. The carrier ply 60 is preferably a graphite fiber reinforced epoxy prepreg cut in the form of the outline for the outer edges of the outer cowl panel 24 with the fibers oriented +/−45° to the longitudinal fore-to-aft axis of the nacelle. Additional carrier plys 64 are arranged on the upper contour 63 of the first concave lay-up mandrel 62 to provide strengthened localized access for fitting holes 28 in the outer cowl panel 24. The carrier ply 60 includes holes 66 at the locations where the honeycomb cores 40 for the track fairings 30 are to be placed and are also oriented +/−45 degrees to the fore-to-aft axis of the nacelle 20.

After the honeycomb core sheet 50 is heat-formed to the shaping tool 52 in accordance with FIGS. 10–12, the honeycomb core sheet 50 is removed from the shaping tool 52, flipped over, and arranged over the holes 66 in the carrier ply 60. The inherent spring-back built into the honeycomb core sheet 50 during the heat-forming process causes the outer edges of the honeycomb core sheet to press against the carrier ply 60, which in turn causes the central portion of the honeycomb core sheet to be spaced from the first concave lay-up mandrel 62 (FIG. 14). Thus, gaps 68 are formed between the central portions of the honeycomb core sheet 50 and the lay-up mandrel 62.

Figure 18:
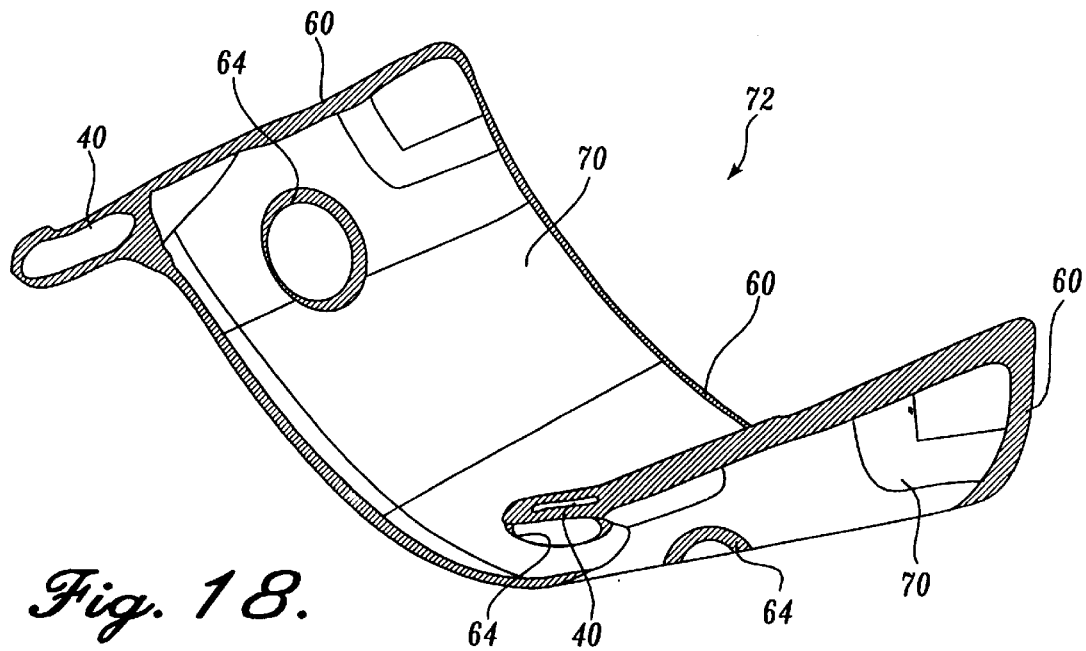
FIG. 18 shows positioning the core and carrier ply of FIG. 17.

After the honeycomb core sheet 50 is in place against the carrier ply 60, fiberglass and aramid fiber honeycomb core 70 (shown in FIG. 18) is extended over the carrier ply 60 and between the outer edges of the carrier ply and the circular carrier plies 64. The fiberglass and aramid core material 70 shown in FIG. 18 is one or more pieces.

The carrier ply 60, the circular carrier plies 64, the honeycomb core 40, and the fiberglass core material 70 form a core assembly 72. The core assembly 72 is vacuum bagged and placed in an autoclave. The core assembly 72 is then cured while suction is applied to the vacuum bag. As can be seen in FIG. 15, the pressure applied by the autoclave (indicated by the arrows P in FIG. 15) presses the honeycomb core sheet 50 against the first concave lay-up mandrel 62 and the carrier ply 60.

Residual stresses formed in the honeycomb core sheet 50 during the curing process cancel the residual stresses formed during the heat-forming process. The cured honeycomb core sheet 50 is a substantially stable structure. The cured honeycomb core sheet 50 maintains the shape of the outer contour of the first concave lay-up mandrel 62.

After the core assembly 72 has been cured, the core assembly is machined, and the honeycomb core 40 for the track fairings 30 is cut and shaped along the dotted line 56. A cutting head 80 is shown in FIG. 16 for removing the excess core material of the honeycomb core sheet 50. The cutting head 80 extends almost to, but not through, the carrier ply 60.

The shape of the honeycomb core 40 for the track fairings 30 also contributes to relieving the inherent spring-back that is built into the honeycomb core sheet 50. Chamfers 74 are formed in the honeycomb core 40 for the track fairings 30 that help prevent the honeycomb core from releasing from the first concave lay-up mandrel 62. To create the chamfers 74, the inner surface 76 (farthest away from the first concave lay-up mandrel 62) of the honeycomb core sheet 50 at the outer edges of where the honeycomb core 40 is to be formed is machined away (FIG. 16). This inner surface 76 includes the majority of the residual thermal stresses formed within the honeycomb core sheet 50. The removal of the inner surface further assures that the honeycomb core 40 will maintain its shape after curing.

In summary, after the core assembly 72 has been machined and cut, the honeycomb core 40 for the track fairings 30 is a stable formation that is capable of maintaining its shape over an extremely tight contour. In this manner, the honeycomb core 40 for the track fairings 30 can be formed with the required radius for the stepped transition area 32 and the outer fairing surface 34.

Figure 20:
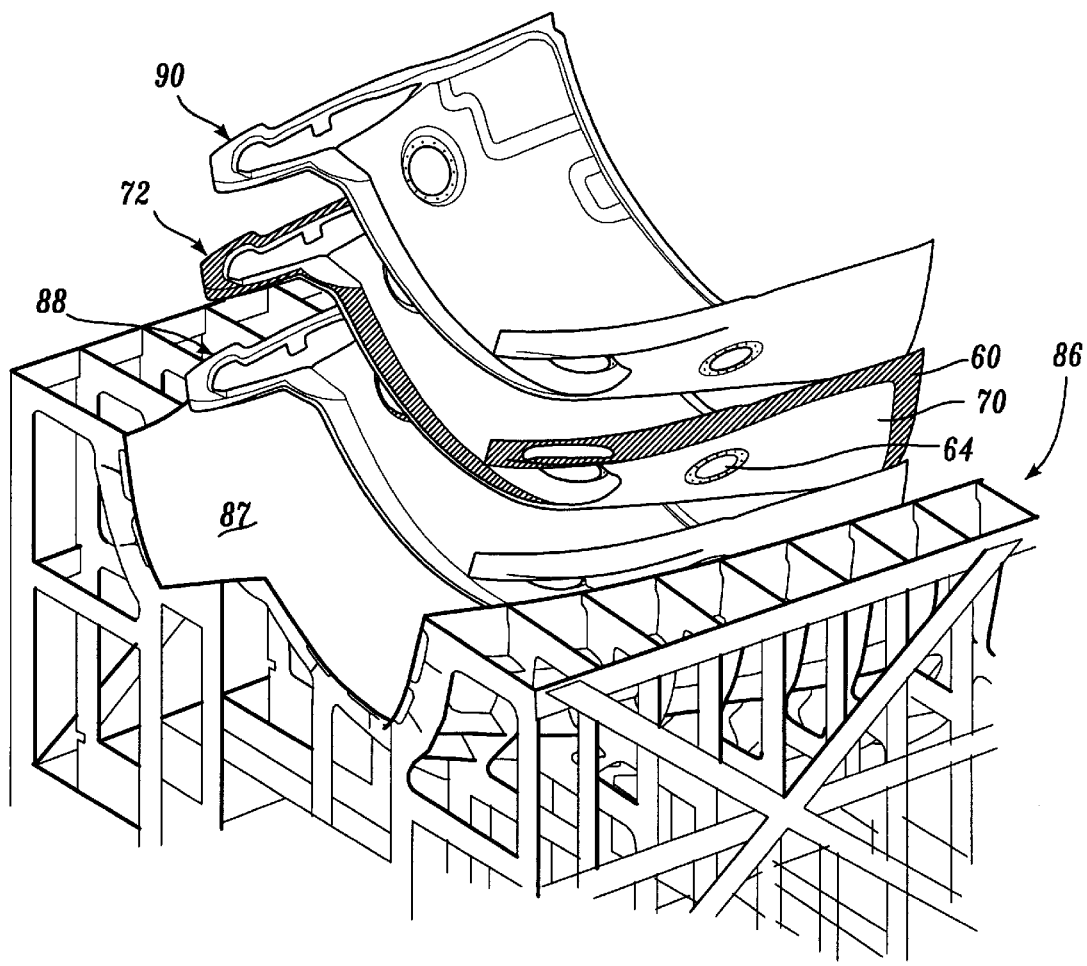
FIG. 20 shows the sequence of assembly for the outer cowl panel of FIG. 7 on a lay-up mandrel.

After the core assembly 72 is formed, the outer cowl panel 24 is built up on a second concave lay-up mandrel 86 (FIG. 20). The second concave lay-up mandrel 86 includes an upper contour 87 that substantially matches the outer surface of the outer cowl panel 24. In a first stage of the assembly shown in FIG. 20, a first wet lay-up of prepreg sheets 88 is arranged on the outer contour of the second concave lay-up mandrel 86. The first wet lay-up of prepreg sheets 88 eventually forms the outer surface of the outer cowl panel 24, as well as the outer face sheet 42 for the integral track fairing 30. With the exception of the outer ply layer(s) on the leading end of the outer cowl panel 24, the first wet lay-up of prepreg sheets 88 is preferably carbon fibers impregnated with an epoxy resin.

Figure 21:
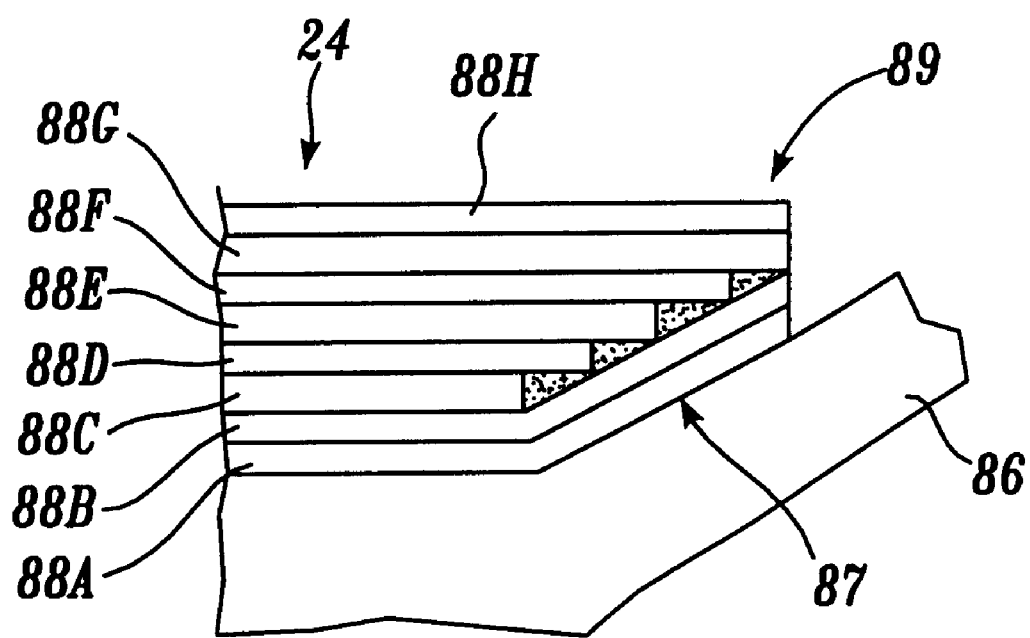
FIG. 21 is a sectional elevation of an erosion-resistant leading edge detail of the outer cowl panel.

As can be seen in FIG. 21, the first lay-up of prepreg sheets 88 includes a unique assembly at its leading end 89. The bottom two prepreg sheets 88A, 88B that are fitted against the upper contour 87 of the second concave lay-up mandrel 86 are preferably interwoven fiberglass impregnated with a resin. Alternatingly, in another preferred embodiment, only the bottom prepreg sheet 88A is fiberglass impregnated with a resin. The fiberglass/resin prepreg sheets 88A and/or 88B provide extra resistance to wind erosion, as described in detail below. The adjacent prepreg sheets 88C, 88D, 88E and 88F are preferably woven carbon fibers impregnated with an epoxy resin. The fiberglass/resin prepreg sheets 88A, 88B can extend all the way to the integral track fairings 32, or only a few inches back from the leading edge 89 of the outer cowl panel 24. In a preferred embodiment of the invention, the fiberglass/resin prepreg sheets 88A, 88B extend rearwardly approximately 1.0 inch from the leading end 89 of the outer cowl panel.

As can be seen in FIG. 21, the fiberglass/resin prepreg sheets 88A, 88B extend forward beyond the adjacent prepreg sheets 88C, 88D, 88E and 88F. The adjacent prepreg sheets 88C, 88D, 88E and 88F are stepped so that the prepreg sheet 88C does not extend as far forward as the prepreg sheet 88D, the prepreg sheet 88D does not extend as far forward as the prepreg sheet 88E, and so forth. The prepreg sheets 88C, 88D, 88E and 88F are preferably stepped so that each of the prepreg sheets 88C, 88D, 88E and 88F extends the same amount beyond the adjacent prepreg sheet. The fiberglass/resin prepreg sheets 88A, 88B wrap upward to extend along the "steps" formed by the ends of the graphite prepreg sheets 88C, 88D, 88E and 88F. Additional prepreg sheets 88G and 88H that terminate at the same end location as the fiberglass/resin prepreg sheets 88A and 88B complete the layup.

After the first wet lay-up of prepreg sheets 88 is arranged on the second concave lay-up mandrel, the core assembly 72 is arranged over the first lay-up of prepreg sheets. The core assembly 72 maintains its shape by the carrier ply 60 holding the fiberglass and aramid core material 70 and the specially shaped honeycomb cores 40 for the track fairings 30 in place. The carrier ply 60 also permits easy handling of the core assembly 72. Finally, a second wet lay-up of prepreg sheets 90 is arranged over the core assembly 72. The entire assembly is vacuum bagged on the lay-up mandrel, placed in a autoclave, and cured.

The outer cowl panel 24 provides many benefits over prior art outer cowl panels. The present invention provides two steps for shaping a honeycomb core sheet 50 so as to form a stable honeycomb core 40 for a track fairing 30. The honeycomb core 40 is used to form a lightweight, core-reinforced composite outer cowl panel 24 in which the track fairings 30 are formed integrally with the outer cowl panel 24.

Forming the track fairings 30 integrally with the outer cowl panel 24 is made possible by the two-step formation (heat-forming and then curing) of the honeycomb core 40 for the track fairings 30. In the two-step process of the present invention, thermal residual stresses and spring-back are formed on opposite sides of the core material, resulting in a stable final core. The two-step formation process for the honeycomb core for the track fairings minimizes the traditional spring-back characteristics of a core formed over a contoured shape. The spring-back characteristics are counteracted because the two-step process produces residual thermal stresses and spring-back characteristics on both sides of the honeycomb core 40 for the track fairings 30. By removing the spring-back characteristics within the honeycomb core 40, the two-step process creates a stable core formation that is capable of maintaining its shape over a tightly contoured surface.

In addition, the shape of the honeycomb core 40 for the track fairings 30 also contributes to relieving the inherent spring-back that is built into the honeycomb core sheet 50. The shape and geometry of the honeycomb core 40, including the chamfers 74, helps to minimize spring-back in the honeycomb core 40. Thus, the honeycomb core 40 for the track fairings 30 maintains the complex geometry of the first concave lay-up mandrel 62, and formation of the track fairings 30 with a honeycomb core 40 integral with an outer cowl panel 24 is possible.

Formation of the track fairings 30 integral with the outer cowl panel 24 avoids many of the problems associated with prior art cowl panels. The outer cowl panel 24 does not require fasteners or brackets to attach separate fairings. Moreover, labor time and expense is reduced because the track fairings 30 do not require separate attachments and assembly. The reduction of parts results in a reduction in weight for the outer cowl panel 24. Applicants have found that the described method produces an outer cowl panel that is 33% lighter than prior art composite outer cowl panels.

The arrangement at the leading edge of the first wet lay-up of prepreg sheets 88 provides another advantage over prior art outer cowl panels. By wrapping the fiberglass prepreg sheets 88A, 88B over the stepped configuration of the adjacent prepreg sheets 88C, 88D, 88E, 88F, the leading edge of the outer cowl panel 24 provides an aerodynamic chamfer without the need for a secondary, mechanically attached device. The aerodynamic chamfer slows erosion of prepreg sheets on the leading edge of the outer cowl panel 24. By extending the fiberglass prepreg sheets 88A, 88B over the leading edge of the adjacent prepreg sheets 88C, 88D, 88E, 88F, wind blows over the surface of the two prepreg sheets 88A, 88B, instead of against the edges of the prepreg sheets 88C, 88D, 88E, 88F as in the chamfered, prior art version. Thus, wind impending on the leading edge 89 of the outer cowl panel cannot abrade the ends of prepreg sheets 88C, 88D, 88E, 88F.

While the preferred embodiment of the invention has been illustrated and described with reference to preferred embodiments thereof, it will be appreciated that various changes can be made therein without departing from the spirit and scope of the invention as defined in the appended claims.

The embodiments of the invention in which an exclusive property or privilege is claimed are defined as follows:

1. A composite outer cowl panel for an engine nacelle, comprising:
   a composite inner face sheet defining a trailing edge;
   a central core extending over the composite inner face sheet and having an outer surface opposite the composite inner face sheet;
   a composite outer face sheet extending over the outer surface of the core and defining a trailing edge and an outer surface opposite the core; and
   an integral track fairing for extending around tracks for translating the outer cowl panel, the integral track fairing formed out of the trailing edges of the composite inner face sheet and the composite outer face sheet, the integral track fairing comprising a composite core sandwiched between the composite inner face sheet and the composite outer face sheet.

2. The outer cowl panel of claim 1, wherein the outer cowl panel adjacent to the integral track fairing defines a plane, and the integral track fairing comprises a stepped transition area extending at a first angle to the plane of the outer cowl panel.

3. The outer cowl panel of claim 2, where the first angle is approximately 115°.

4. The outer cowl panel of claim 3, wherein the integral track fairing comprises an outer fairing surface extending at a second angle to the stepped transition area.

5. The outer cowl panel of claim 4, wherein the second angle is approximately 88°.

6. The outer cowl panel of claim 5, wherein the composite core extends along the stepped transition, through the second angle between the stepped transition area and the outer fairing surface, and along the outer fairing surface.

7. The outer cowl panel of claim 6, wherein the composite core is honeycomb.

8. An outer cowl panel for a nacelle engine comprising:
   a carbon fiber reinforced laminate having a leading edge defined by stacking of a plurality of plies to form the laminate; and
   a facing ply with fiberglass reinforcement covering the leading edge to provide erosion protection.

9. The outer cowl panel of claim 8, wherein the plurality of plies comprise:
   a first fiber/resin sheet, the first fiber/resin sheet extending toward the leading end of the outer cowl panel so as to form a first end;
   a second fiber/resin sheet, the second fiber/resin sheet extending over the first fiber/resin sheet and extending to a second end, the first end being closer to the leading end than the second end; and
   a third fiber/resin sheet extending over and against the second fiber/resin sheet, the third fiber sheet extending past the second end and downward toward the first end and attaching to the first end such that the third fiber/resin sheet forms the facing ply.

10. The outer cowl panel of claim 9, wherein the plurality of plies further comprises a fourth fiber/resin sheet extending over and against the third fiber/resin sheet, the leading end of the fourth fiber/resin sheet extending downward so as to form the facing ply with the third fiber/resin sheet.

11. The outer cowl panel of claim 8, wherein the facing ply comprises fiberglass fibers.

* * * * *

UNITED STATES PATENT AND TRADEMARK OFFICE
CERTIFICATE OF CORRECTION

PATENT NO. : 6,129,311
DATED : October 10, 2000
INVENTOR(S) : J.M. Welch et al.

It is certified that error appears in the above-identified patent and that said Letters Patent is hereby corrected as shown below:

Title page,
Item [56], References Cited, FOREIGN PATENT DOCUMENTS, please insert in appropriate order the following: -- FOREIGN PATENT DOCUMENTS 3 625 534 11/1988 Germany --

Column 12,
Line 21, "third fiber sheet" should read -- third fiber/resin sheet --

Signed and Sealed this

Fourth Day of December, 2001

Attest:

NICHOLAS P. GODICI
Attesting Officer
Acting Director of the United States Patent and Trademark Office